United States Patent Office 2,746,211
Patented May 22, 1956

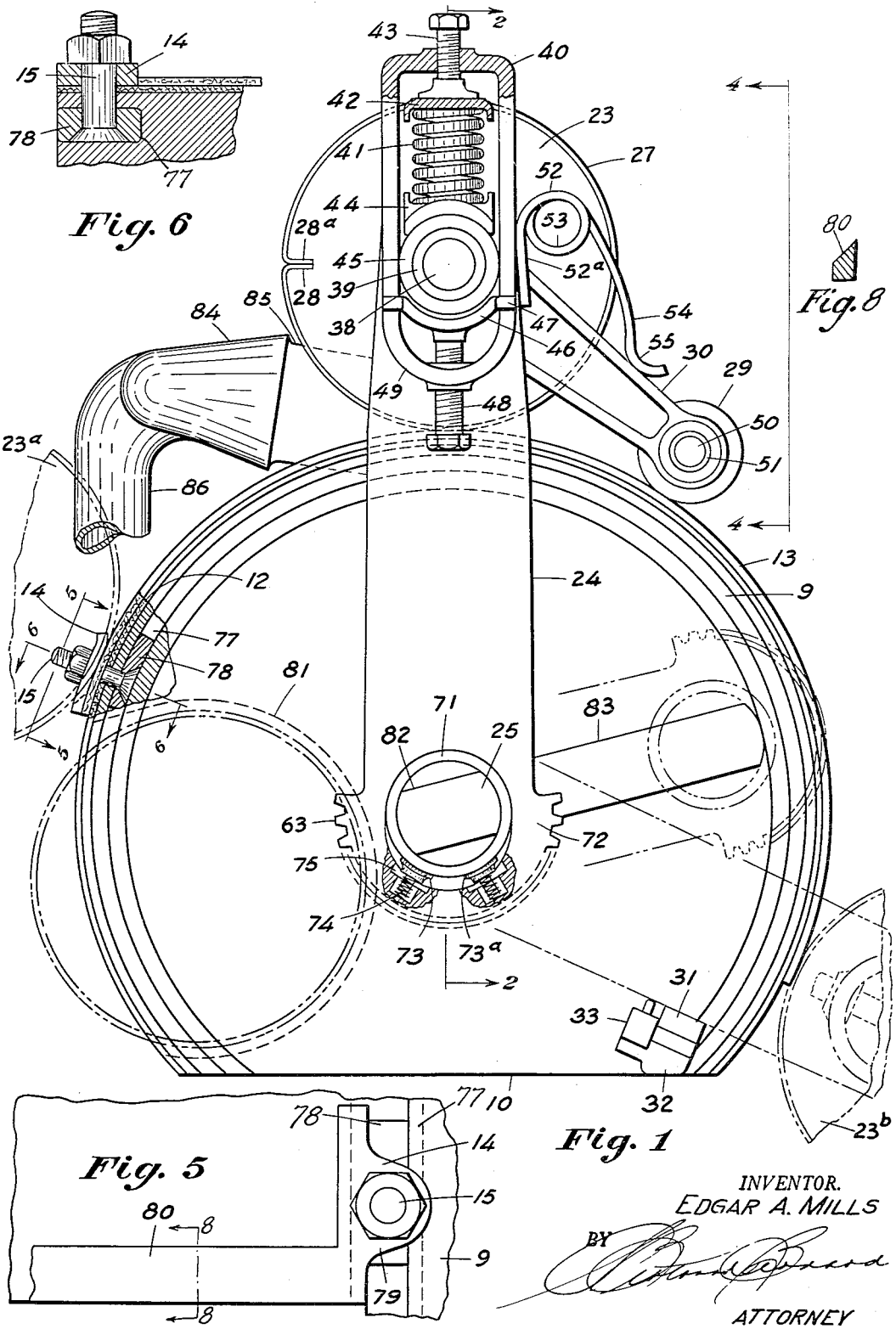

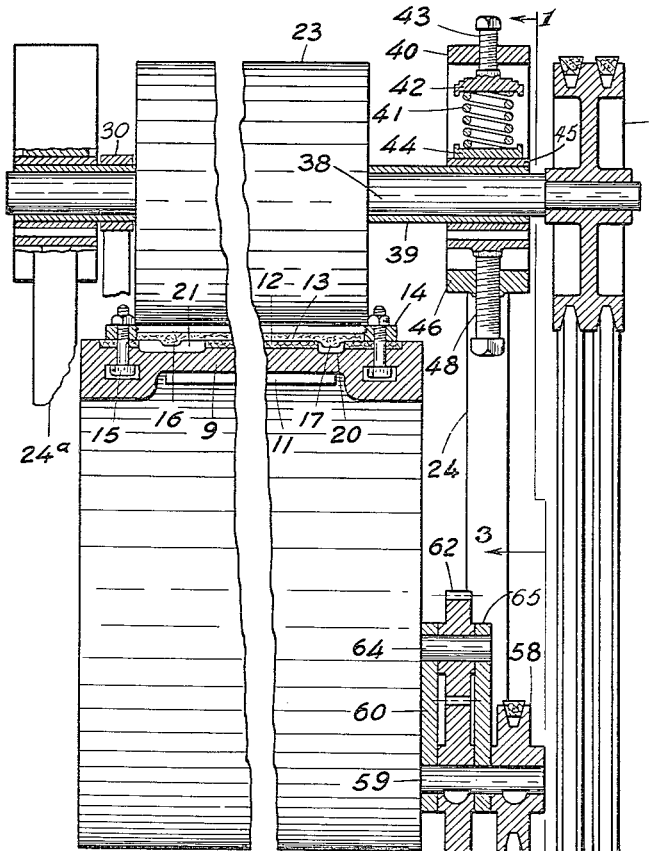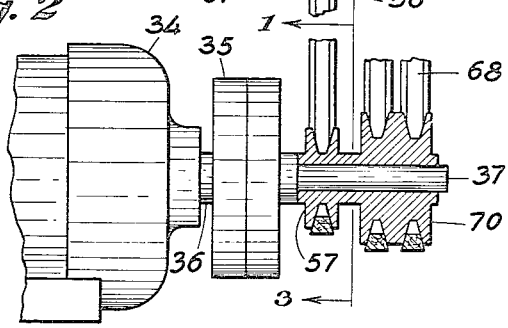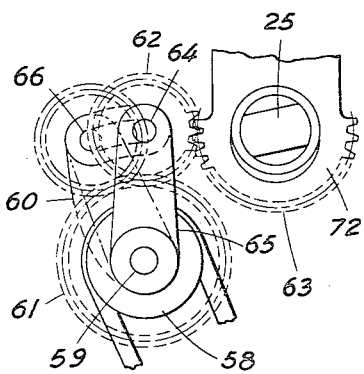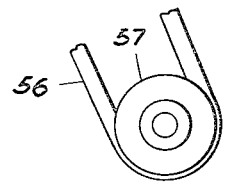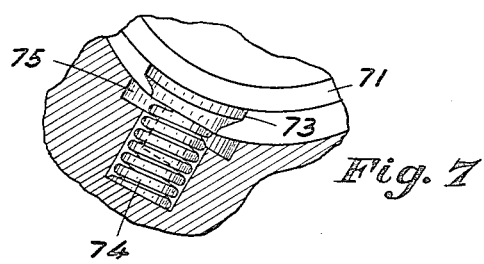

2,746,211

MACHINE TO ABRADE STEREOTYPING PACKLESS MATRICES

Edgar A. Mills, Long Island City, N. Y.

Application April 6, 1954, Serial No. 421,265

10 Claims. (Cl. 51—33)

This invention relates to matrices used for preparing plates employed in the stereotype printing of newspapers and the like, and is particularly directed to an improvement in the method of making the matrix for simplifying its use, and to an apparatus for reducing matrices in order to render them packless.

In the usual matrix used for producing stereotype plates, it is necessary to provide a packing or backing on the rear face of the matrix so that the forward or type face of the matrix is held in a uniform position in order to provide a uniformly contoured stereotyping plate, when it is cast against the matrix.

With the conventional type of matrix, the matrix after molding and scorching is relatively uneven on the rear surface, thus requiring packing to iron out the irregularities.

Applicant in forming the matrix, employs a mat formed of a single element.

With applicant's construction, the matrix after molding and scorching is placed in the reducing apparatus, while still hot from the scorcher. The rear face of the matrix is then reduced to a uniform smooth even surface, and a uniform thickness over its entire area relative to the printing surface.

Applicant further provides a heated storage cabinet, as part of the reducing apparatus, so that the matrices can be stored in their heated condition until they are ready for plate casting.

The primary object of my invention is to provide a uniform stereoscopic matrix, which can be used for plate casting without special packing or backing of any kind.

A further object is to provide a matrix reducing apparatus, which will accurately align and support the matrix during the reducing operation, the sides of the matrix being accurately located by means of integral bolsters and accurately clamped and mounted on the machine platen so that a matrix of uniform thickness and a smooth rear surface is obtained over the entire type area.

A further feature of applicant's construction is the fact that the matrix is uniformly smoothed and held in place by a spring loaded auxiliary aligning roller, which is located in advance of the reducing roller and is moved along therewith.

Another object of my invention is to provide uniform accurate matrices, so that smooth uniform stereoscopic plates can be made therefrom without special adjustment or unnecessary handling.

An important feature of my apparatus and method is that the normal method of molding of matrices is not disturbed in any manner, the matrix up to the point of reducing being handled in the conventional manner.

A further feature of the apparatus and method is that the printing surface provided by my improved matrix can be used with equal facility on plates utilized for single color or multi-color printing.

The accompanying drawings, illustrative of one embodiment of the apparatus of my invention, together with the description of its construction and the method of operation and utilization thereof, will serve to clarify further objects and advantages of my invention.

In the drawings:

Fig. 1 represents a side elevation of the assembled apparatus, taken at 1—1, Fig. 2, showing a matrix mounted on the platen with the abrading drum at the top of its path, also showing the reducing roller at the start and end of its path in dot-dash lines. The reducing roller and roller support arm are also shown in the lower position with the roller moved into a cavity in the platen.

Fig. 2 is a partial vertical section through the reducing roller and platen shown in Fig. 1, and the reducing roller drive mechanism, taken at 2—2, Fig. 1, and a partial front elevation of the platen and the reducing roller, shown in Fig. 1, with the matrix located in place on the platen surface sheet.

Fig. 3 is a side elevation of the reducing roller side arm and the abrading drum drive mechanism, shown in Fig. 2, taken at 3—3, Fig. 2.

Fig. 4 is a rear view of the abrading drum and the auxiliary roller, shown in Figs. 1 and 2, taken at 4—4, Fig. 1, showing the auxiliary roller control spring and the method of supporting it.

Fig. 5 is a partial front elevation of the matrix clamp, shown in Fig. 1, taken at 5—5, Fig. 1.

Fig. 6 is a section through the matrix clamp, the matrix clamp slider and the matrix clamp bolt shown in Figs. 1 and 5, taken at 6—6, Fig. 1.

Fig. 7 is an enlarged section through a portion of the lower hub of the roller support side arm, shown in Fig. 1, showing one of the angularly positioned side arm locating shoes and the spring pressing the shoe against the platen shaft bushing.

It will be understood that the following description of the construction and the method of operation and utilization of the apparatus for developing stereotyping packless matrices is intended as explanatory of the invention and not restrictive thereof.

In the drawings, the same reference numerals designate the same parts throughout the various views, except where otherwise indicated.

One ebodiment of the apparatus, shown in Figs. 1 and 2, is supported by a hollow platen 9, of substantially cylindrical form, the bottom edge 10 of the platen being flattened as shown in Fig. 1, so that it can be supported by a flat cabinet, a set of legs, or other suitable support.

As indicated in Fig. 2, a plurality of electrically heated heating elements 11 are fitted to the inner surface of the circumferential outer wall of the platen, to maintain the matrices at about their initial temperature.

A sheet of asbestor 12, rubber, or other compressible material, is attached to the outer circumference of the platen 9 to protect the matrices from direct contact with the metal of the platen 9 and to uniformly distribute the heat transmitted by the heating elements to the platen.

A molded matrix 13, directly as it comes from the matrix scorcher is mounted on the outer circumference of the asbestos sheet on the platen, in the manner indicated in Fig. 1, the forward edge of the matrix being clamped to the surface of the platen sheet by a long clamp 14, which extends along the entire length of the matrix, the clamp being held in engagement with the matrix by a plurality of screws 15, bolts, or other suitable support means, in a manner hereinafter described in greater detail.

The usual matrix, which is used for casting stereoscopic printing plates has a pair of integral bolsters 16 and 17 depending from the bottom surface thereof.

In order to align the matrix with the outer surface of the asbestos sheet on the platen 9, a circumferential groove 20 is cut into the outer circumference of the platen, in alignment with the right-hand bolster 17, Fig. 2. A slot, the width of which, is substantially the same as that of the circumferential groove 20, is cut through the asbestos sheet 12 in alignment with the circumferential groove 20 in the platen. The edges of the slot through the asbestos sheet receive the right-hand matrix bolster 17, thereby longitudinally aligning the matrix with the platen surface. In place of the asbestos sheet 12, a compressible pad made of sheet material such as sponge rubber may be substituted, the pad or compressible sheet being mounted on the platen in place of the asbestos sheet and attached to the platen in substantially the same manner.

Where such a compressible pad is employed, the pad has a slot therethrough in alignment with the groove in the platen, which clears the right-hand matrix bolster 17, the edges of the slot in the pad engaging the edges of the right-hand matrix bolster 17, thereby longitudinally aligning the matrix with the compressible pad and the platen surface under it.

Due to variations in matrix width, caused by shrinking and scorching, the spacing between the left and right-hand bolsters varies considerably between individual matrices. A wider circumferential groove 21 is cut around the outer circumference of the platen 9, adjacent the left-hand edge thereof, the left-hand groove clearing the left-hand bolster 16 integral with the matrix, thereby allowing the lower or type face of the matrix to follow accurately the contour of the platen and rest smoothly against the outer surface of the sheet surrounding the platen.

An abrading drum 23, which is mounted adjacent the outer circumference of the platen is rotatably supported by a pair of side arms 24 and 24a, the lower end of the side arms being rotatably supported by a through shaft 25 projecting beyond the ends of the platen, at substantially the center thereof.

The abrading drum 23, which is cylindrical and extends along the entire length of the matrix 13, has an outer sheet of sandpaper 27, emery cloth, or other suitable abrasive material wrapped around the outer circumference thereof, the ends 28 and 28a of the sandpaper being fitted into a radial slot cut into the outer circumference of the abrading drum to clamp the abrasive reducing sheet to the drum 23.

An auxiliary roller, which is rotatably mounted on a lever 30 pivotally supported by the abrading drum shaft bushing, is mounted a short distance in advance of the abrading drum. The auxiliary roller, which extends longitudinally along the entire length of the matrix 13, engaging the outer surface of the matrix 13 to press the matrix against the outer surface of the asbestos platen sheet, thereby retaining the matrix in engagement with the platen, so as to form a uniform surface, parallel to the platen contour, after the abrading drum finishes the rear face of the matrix.

The abrading drum 23 starts at the point 23a, shown by dot-dash lines, left-hand Fig. 1, at the clamped end of the matrix, and is advanced in a clockwise direction by the rotation of the side arms 24 and 24a, until the abrading drum reaches the end of its stroke 23b at the right-hand edge of the matrix, Fig. 1, when the matrix surface abrading operation is completed.

When the drum side arms 24 reach the end position, shown by dot-dash lines, Fig. 1, a rubber, or other suitable type of bumper 31, which is supported by a bracket 32 attached to one end of the platen engages the edge of each side arm 24, thereby limiting the movement of the side arms 24 and 24a and the abrading drum supported thereby.

The bracket, which supports each of the bumpers 31, is adjustable relative to the platen thereby varying the stroke of the abrading drum in conformity with the length of the matrix 13.

A microswitch 33 may be supported by the bracket 32, adjacent the bumper, the control plunger or lever of the microswitch engaging the edge of the side arm 24 to shut off the flow of current to an electrically driven motor which drives the reducing cylinder and other rotating parts of the apparatus, the motor being connected to the reducing cylinder shaft by V-belts or other suitable means in a manner hereinafter described in greater detail, when the side arm approaches the end of its stroke, before it engages the bumper in the position shown in dot-dash lines at the right-hand side, Fig. 1.

The abrading drum 23 and the drum side arms 24 are driven by a reduction gear motor 34 mounted in the base of the apparatus, below the platen 9, as indicated in Fig. 2, a clutch 35 supported by the motor shaft 36 being employed to drive an auxiliary drive shaft 37, which is mounted in substantial alignment with the motor shaft.

The abrading drum 23 is supported and driven by a cylindrical shaft 38 mounted at the center of the drum, the shaft 38 being rotatably supported by a pair of bushings 39 slidably supported in a radially adjustable position by a pair of open parallel-faced brackets 40 attached to or integral with the upper end of the side arms 24 and 24a. Each of the side arm brackets has a central opening therethrough, the sides of the opening being substantially parallel to one another. The lower portion of the bracket opening as shown in Fig. 1 is of substantially semicircular contour.

A coiled compression spring 41 is mounted between the drum shaft 38 and the upper cross-arm of each bracket 40, the upper end of the compression spring engaging a spring retainer 42 attached to an adjusting screw 43 threadably fitted to the cross-arm of the bracket 40, as indicated in Fig. 1.

The lower end of each compression spring 41 engages a shoe 44, which presses against a collar 45 slidably mounted in the central opening in the bracket 40, the collar retaining the bushing 39, which rotatably supports the abrading drum shaft 38, in the manner shown in Fig. 1 thereby supporting the abrading drum shaft 38 in a radially adjustable position.

A lower shoe 46, which is mounted below the collar 45, engages or clears the bottom of the collar 45 in order to locate the drum shaft radially relative to the platen 9 depending upon the position of the lower shoe 46 relative to the longitudinal centerline of the platen, which is controlled by a lower adjusting screw, the operation of which is hereinafter described in greater detail, the lower shoe having a pair of ears 47 at the opposite sides thereof, the ears engaging the side walls of the open bracket 40 in order to laterally locate the lower shoe relative to the bracket.

The abrading drum 23 may be located relative to the upper surface of the matrix 13 mounted on the platen surface sheet 12 by the pressure of the compression springs 41 against the collars 45 supporting the abrading drum shaft 38. Where pressure variation of the sanding surface surrounding the abrading drum, relative to the matrix is required, the position of the lower shoe may be adjusted by means of a lower adjusting screw 48 threadably fitted to the lower cross-bar 49 of the side arm bracket 40, as indicated in Fig. 1, the upper surface of the lower shoe engaging the bottom of the collar 45 to radially locate the collar.

The central hub of each of the auxiliary roller support levers 30 is mounted on the abrading drum shaft bushing 39, thereby pivotally supporting the auxiliary roller 29. The auxiliary roller 29 is supported by an auxiliary roller shaft 50, which is trunnioned in a pair of bushings 51 fitted to the outer hubs of the auxiliary roller support levers 30, as indicated in Fig. 1.

An arcuate plate spring 52, the depending leg 52a of which is attached to the adjacent side wall of the roller support bracket 40, is employed to press the auxiliary roller support lever downward, the auxiliary roller engaging the upper surface of the matrix 13, mounted on the outer circumference of the platen coating sheet 12.

The plate spring 52 has a substantially circular loop 53 integral therewith, the outer or free end of a long spring arm 54 integral with the outer side of the loop 53 engaging the upper edge of the auxiliary roller lever to press the auxiliary roller 29 against the upper surface of the matrix. The outer end of the long spring arm has a formed arcuate lip or projection 55 integral therewith, the arcuate lip engaging the upper edge of the auxiliary roller lever 30.

An eccentric or cam may be mounted on each of the side arms 24, 24a, adjacent the open side arm bracket 40, the eccentric or cam being attached to the collar 45 surrounding the abrading drum shaft, the eccentric or cam having a lever at the outer end thereof, which may be manually angularly elevated or lowered in order to adjust the angular position of the eccentric or cam, and thus elevate or lower the abrading drum relative to the platen against the pressure of the coiled compression spring 41 mounted at the center of the open side arm bracket, and in that manner control the finished thickness of the matrix mounted on the platen.

As indicated in Figs. 2 and 3, the side arms 24 and 24a supporting the abrading drum are rotatably driven by a V-belt 56, which connects a V-belt drive pulley 57 mounted on the auxiliary drive shaft, with a gear drive pulley 58 mounted on an intermediate shaft 59, which is rotatably supported by a plate bracket 60 attached to one end of the platen 9, through a pair of spur gears 61 and 62 mounted adjacent the bracket 60. The gear drive pulley drives an idler gear 61 supported by the intermediate shaft 59, the intermediate gear driving a pinion 62, the teeth of which engage the mating teeth formed on a spur gear sector 63, which is located around a portion of the outer circumference of the hub of the drum support side arm 24, as indicated in Figs. 2 and 3. The gear drive pulley 58 and the intermediate gear 61 are pressed on or keyed to the intermediate shaft 59, thus enabling the gear drive pulley to rotate the intermediate shaft 59 with the intermediate gear 61 attached thereto.

The pinion 62 is rotatably supported by a pinion shaft 64 mounted at the upper end of a short lever 65, the lower end of which is supported by the intermediate shaft 59.

In order to allow the pinion 62 to be moved out of engagement with the teeth in the side arm hub sector 63, an arcuate slot 66 is provided in the plate bracket 60, the arcuate slot clearing the pinion shaft 64 and allowing it to move from the position shown in solid lines, Fig. 3, with the pinion in engagement with the teeth in the side arm sector 63, into the position shown by dot-dash lines, Fig. 3, with the pinion teeth completely clear of the teeth in the side arm sector 63, thus enabling the side arms to be returned from the end position, right-hand side, Fig. 1, to the starting position at the left-hand side, Fig. 1.

The abrading drum 23 is driven by a pair of V-belts 68, which drive a pair of V-belt pulleys 69 attached to one end of the abrading drum support shaft 38, from a pair of drive pulleys 70 mounted on the auxiliary drive-shaft 37, as indicated in Figs. 2 and 3. The abrading drum is driven continuously while the driven member of the clutch 35 is in engagement with the clutch driving member attached to the motor shaft 36. The support arm sector drive pulley 57 is synchronized with the abrading drum drive pulley, so that the drum support arm is rotated continuously about the platen axis, thus co-ordinating the rotational movement of the abrading drum with the arcuate movement thereof about the platen circumference. The auxiliary roller 29 while free to rotate, is not driven, the auxiliary roller merely being in engagement with the outer surface of the matrix to retain the matrix in continuous engagement with the outer surface of the sheet surrounding the platen 9.

A tubular bushing 71 is fitted to an oval cutout in the lower hub 72 of each side arm 24, each bushing being trunnioned on the adjacent end of the platen shaft 25 projecting beyond the ends of the platen at substantially the radial center line thereof, thereby rotatably supporting the side arm 24.

In order to retain the side arms in the operating position, shown in Fig. 1, a pair of angularly positioned, spring loaded shoes 73 and 73a is fitted to angularly disposed cavities formed in the side arm hub 72. A coiled compression spring 74 is mounted in each of the angular cavities in the side arm hub 72, the upper end of each spring 74 engaging the corresponding shoe 73, thereby pressing the shoes 73 and 73a against the tubular bushing 71 and normally retaining the side arm in its operating position, shown in Fig. 1.

In returning the abrading drum 23 from the end position, shown by dot-dash lines at the right-hand side, Fig. 1, to the starting position, shown by dot-dash lines at the left-hand side, Fig. 1, it is desirable to elevate the side arms 24 and 24a, so that the circumference of the abrading drum 23 clears the upper surface of the matrix 13 mounted on the platen 9, thereby avoiding any possibility of injuring the finished upper surface of the matrix 13.

In order to elevate the abrading drum out of engagement with the outer surface of the matrix 13, the side arms are raised by a lifting mechanism (not shown) until the spring-loaded shoes 73 and 73a are depressed into the angularly positioned counterbores 75 formed at the top of the cavities in the side arm hub 72. This enables the shoes 73 and 73a to be depressed against the pressure of the compression springs 74, until the upper surface of the shoes 73 and 73a is relatively flush with the bottom of the oval cutout in the hub of the side arm 24, the arcuate bottom surface of the cutout engaging the outer circumference of the platen shaft bushing 71, thereby elevating the side arms 24 and 24a, and enabling the abrading drum to clear the upper surface of the matrix 13 during the return stroke of the abrading drum 23.

In order to provide for variations in length of the matrix to accommodate a matrix less than a full page in length on the platen surface, a circular segmental channel 77 is cut into each end wall of the platen, the inner side of the channel engaging the adjacent edge of a clamp support slider 78, which is slidably fitted thereto, in order to locate the slider relative to the platen.

A short slider 78 of circular segmental longitudinal contour, following the contour of the circular segmental channel, is fitted to the channel, the head of the clamp bolt 15, which is of frusto-conical form, fitting into a mating countersink formed in the bottom of the slider 78.

The sliders 78 attached to opposite ends of the clamp 14, enable the clamp to be moved into any required radial position around the circumference of the platen, thus enabling the clamp to grip the end of a short matrix, the forward end of which is located anywhere along the surface sheet surrounding the circumferential outer surface of the platen.

The matrix clamp proper comprises a pair of end flanges 79, through each of which a clamp bolt 15 is fitted, the end flanges being located in substantial longitudinal alignment with the circumferential channel 77, and a long integral clamping bar 80, extending over the entire width of the matrix, the clamping bar being relatively flat at the bottom and of substantially triangular cross-section, to enable it to clear the outer surface of the abrading drum 23 when the drum is located at the starting position 23a, shown in dot-dash lines at the left-hand side, Fig. 1.

When the clamp flanges 79 are clamped to the outer surface of the platen 9, by means of nuts threadably fitted to the upper end of the bolts 15, the clamping bar 80 engages the upper surface of the adjacent end of the matrix 13, thereby clamping the matrix to the surface of the sheet surrounding the platen.

The clamp retains the matrix in place on the platen surface sheet while the abrading drum is moved from the starting position 23a, shown in dot-dash lines, Fig. 1, to the end position, shown at the opposite side of the platen, Fig. 1.

In order to allow the abrading drum 23 to be moved close to the front of the platen, in advance of the starting position of the drum, left-hand side, Fig. 1, a cavity 81 of circular segmental cross-section, the radius of which is larger than the radius of the abrading drum, is formed in the front of the platen, Fig. 1.

A pair of substantially parallel angularly positioned flats 82 is formed on the platen shaft 25 in alignment with the end walls of the platen 9. A parallel-faced slot 83 is cut through each platen end wall, the angular position of the parallel surfaces of the slot 83 corresponding with the angular position of the flats 82 on the platen shaft, the spacing between the slot faces clearing the flats on the platen shaft to enable the platen shaft 25, with the roller side arms fitted thereto, to be moved from the normal operating position, shown in Fig. 1, to the displaced position, shown by dot-dash lines at the right-hand side, Fig. 1, the platen shaft being located adjacent the right-hand side of the platen, Fig. 1.

This enables the hub of each side arm 24, which is supported by the platen shaft 25, to be moved to the side position, shown by dot-dash lines, Fig. 1, the abrading drum 23 being moved into the cavity 81 in the platen so that the outer circumference of the abrading drum projects only a relatively short distance beyond the front of the platen, and in that manner enabling an operator to come close to the platen to remove and replace the matrix 13 with a minimum of interference from the abrading drum, which is located ahead of the starting position, in the operating range, shown in Fig. 1.

A long dust collector scoop 84 is mounted adjacent the abrading drum 23, at the junction between the abrading drum and the platen, to collect the dust thrown off by the abrading drum in abrading the matrix surface. The scoop 84 is attached to the side arms 24 and 24a by a set of plate brackets 85, as indicated in Fig. 1, thus enabling the scoop to follow the angular movement of the side arms 24 and maintain its relationship with the abrading drum 23. The scoop 84 extends along the entire length of the abrading drum 23, thus collecting substantially all of the dust generated by the abrading drum.

A duct 86 connected to the rear end of the scoop 84, Fig. 1, conveys the dust from the scoop to a dust container (not shown), which is connected to the free end of the duct by a flexible hose (not shown) to enable the scoop to follow the movement of the side arm.

The operation of the unit is substantially as follows:

A molded matrix 13, directly as it comes from the scorcher, is placed on the outer surface of the asbestos sheet surrounding the platen 9, the right-hand bolster 17 at the under surface of the matrix being aligned with the right-hand groove in the platen, Fig. 1, to accurately align the matrix with the platen. The forward end of the matrix is then clamped to the surface of the platen sheet by means of the clamp 14, by tightening of the nuts, or other clamping means, thereby pressing the clamp against the platen sheet 12.

The abrading drum is moved to the starting position at the left-hand side of the platen, Fig. 1, by the motion of the drum side arms to the starting position.

The side arm sector drive pinion 62 is moved into the operating position, shown in Fig. 3, along the slot 66 in the plate 60, the pinion meshing with the teeth in the side arm sector 63.

When the motor 34 is started and the clutch 35 engaged, the drive pulleys 70 rotate the abrading drum by means of the connecting V-belts 68. The side arm sector drive pinion 62, in the position shown in Fig. 3, simultaneously rotates the side arms 24 and 24a about the platen shaft 25, thereby moving the abrading drum about the outer surface of the matrix, which is located on the platen surface sheet. The auxiliary roller 29, which is spring loaded, is advanced ahead of the abrading drum 23 in order to accurately position the matrix on the outer surface of the platen surface sheet.

The rotation of the abrading drum and the simultaneous angular movement of the side arms continues until the abrading drum reaches the end position, shown in dot-dash lines at the right-hand side, Fig. 1.

This completes the surface finishing of the rear face of the matrix.

When the side arm 24 reaches the end position, shown at the right-hand side, Fig. 1, it engages a micro-switch 33 attached to the bumper bracket 32, thereby shutting off the flow of current to the motor 34.

When the side arm 24 reaches the bumper 31 supported by a bracket attached to the platen, the movement of the side arm is positively arrested, thus retaining the side arm, with the abrading drum supported thereby, in the end position, shown at the right-hand side, Fig. 1.

When the motor is shut off, or the clutch 35 connecting the motor to the auxiliary drive shaft is disengaged, the abrading drum and the side arm drive pulleys are arrested, thus permitting the abrading drum to be manually restored to its starting position.

The side arm drive pinion is moved out of engagement with the side arm sector 63 by the motion of the pinion along the arcuate slot 66 in the plate, from the position shown in Fig. 3 to the disengaged position shown by dot-dash lines, Fig. 3, thus allowing the side arms to be moved radially outward relative to the platen shaft 25.

The side arms 24 may then be moved radially outward against the pressure of the angularly positioned compression springs 74, thus enabling the abrading drum 23 to definitely clear the reduced rear surface of the matrix, while the abrading drum is restored to its starting position, shown in dot-dash lines at the left-hand side, Fig. 1.

The clamp 14 may then be released from the matrix by opening the clamp bolt nuts, thus allowing the matrix 13 to be removed from the platen and a new matrix substituted therefor.

In order to provide more room for the operator at the front of the machine, the side arms 24 with the abrading drum attached thereto may be moved angularly downward to the angular position shown in dot-dash lines, Fig. 1, after which the side arms may be moved angularly outward along the angularly positioned slots 83 until the abrading drum enters the cavity in the platen, the abrading drum being moved into the lower position, shown at the left-hand side, Fig. 2, with the forward edge of the abrading drum located a short distance ahead of the front of the platen, thus providing a minimum of interference with the operator in adjusting the apparatus.

The completed matrix, after it is removed from the reducing apparatus, may then be stored in a heated cabinet mounted under the platen, or placed directly in the plate casting machine, no packing or backing being required in conjunction with the packless matrix as it is received from the apparatus after abrading.

It will be apparent to those skilled in the art that my present invention is not limited on the specific details described above and shown in the drawings, and that various modifications are possible in carrying out the feature of the invention and the operation, actuation, and the method of utilization thereof, without departing from the spirit and scope of the appended claims.

What I claim is:

1. An apparatus for reducing stereotyping printing matrices, each of said matrices having a pair of holsters at opposite sides thereof for longitudinally locating the matrix relative to the apparatus, comprising a fixed platen of substantially circular segmental outer contour, means for supporting a matrix against the circumferential outer surface of said platen, means formed in said platen operative to longitudinally align the matrix with the circumferential outer platen surface, a substantially cylindrical abrading drum rotatably mounted substantially parallel to the platen longitudinal axis, the outer surface of said abrading drum being located a short distance radially from the outer surface of the platen, abrasive means surrounding the abrading drum circumference operative to reduce the outer surface of the matrix, a pair of arms rotatably supported by the platen end walls, means fitted to the arms operative to radially adjustably support the abrading drum shaft relative to the circumferential outer surface of the platen, a pair of levers pivotally attached to the abrading drum, an auxiliary roller rotatably supported by the levers, spring means mounted adjacent the levers operative to press the auxiliary roller toward the outer surface of the platen in advance of the abrading drum, means for rotating the arms to progressively angularly advance the abrading drum relative to the platen outer surface, spring means fitted to the abrading roller support means for retaining the abrading roller surface in engagement with the circumferential outer surface of the platen, means for radially adjusting the position of the axis of rotation of the reducing roller relative to the outer platen surface, means for rotating the abrading drum, and means for progresively angularly advancing the abrading drum relative to the outer surface of the matrix mounted on the circumferential outer platen surface.

2. An apparatus for reducing the surface of a matrix opposite the type face thereof, each of said matrices having a pair of holsters at opposite sides thereof for longitudinally locating the matrix relative to the apparatus, comprising a platen of substantially circular segmental outer contour, said platen having an outer wall and a pair of end walls integral with the outer wall, means for heating the circumferential outer wall of the platen, a sheet of pliable material attached to the circumferential outer wall of the platen, means formed in said platen operative to receive the matrix longitudinal locating means to longitudinally align the matrix relative to the circumferential outer platen surface, means for clamping one end of the matrix to the pliable sheet attached to the platen adjustably attached to the platen, an abrading drum mounted substantially parallel to the longitudinal platen axis, a sheet of abrasive material surrounding the circumferential outer surface of the abrading drum, the outer surface of said abrasive sheet being positioned a short distance radially from the outer surface of the platen, means pivotally supported by the platen operative to rotatably support the abrading drum, means for rotating the abrading drum, and means for progressively radially advancing the abrading drum relative to the matrix outer surface.

3. An apparatus for reducing stereotyping printing matrices, each of said matrices having a pair of depending bolsters at opposite sides thereof for longitudinally locating the matrix relative to the apparatus, comprising a platen of substantially circular segmental outer cross-section, means formed on the platen operative to longitudinally align a matrix with the platen circumferential outer surface, a substantially cylindrical abrading drum mounted substantially parallel to the longitudinal platen axis, a pair of side arms rotatably supported by the platen, means fitted to the side arms operative to adjustably support the abrading drum relative to the platen outer circumferential surface, an abrasive sheet attached to the outer circumference of the abrading drum a short distance radially from the circumferential platen surface, a pair of levers pivotally attached to the abrading drum, an auxiliary roller rotatably supported by the levers, said auxiliary roller being operative to press the matrix against the circumferential outer surface of the platen in advance of the abrading drum, means for rotatably driving the abrading drum, means for rotating the arms to progressively angularly advance the abrading drum relative to the matrix outer surface, and means for synchronizing the rotation of the side arms with the abrading drum rotation.

4. An apparatus for reducing stereotyping printing matrices, each of said matrices having a pair of depending bolsters at opposite sides thereof for longitudinally locating the matrix relative to the apparatus, comprising a platen of substantially circular segmental outer cross-section, said platen having an outer wall, and a pair of end walls integral with the outer wall, clamp support means adjustably fitted to the platen, said clamp support means being adjustable in a direction substantially parallel to the circumferential platen surface, means attached to said clamp support means operative to clamp one end of a matrix to the circumferential outer platen surface, a sheet of relatively soft material attached to the circumferential outer surface of the platen, a substantially cylindrical abrading drum mounted substantially parallel to the longitudinal platen axis, a rotatably mounted shaft supporting the abrading drum, a sheet of abrasive material attached to the circumferential outer surface of the abrading drum in normal operative contact with the outer surface of a matrix mounted on the platen, a pair of arms rotatably supported by the platen end walls, means fitted to the arms operative to radially adjustably support the abrading drum shaft relative to the sheet of soft material attached to the platen circumferential outer surface, a pair of levers pivotally attached to the abrading drum, an auxiliary roller rotatably supported by the levers, spring means mounted adjacent the levers operative to press the auxiliary roller against the matrix surface to smooth the matrix surface in advance of the path of the abrading drum, means for rotatably driving the abrading drum, means for rotating the arms to progressively angularly advance the abrading drum relative to the matrix outer surface, and means for synchronizing the rotation of the arms with the abrading drum rotation.

5. An apparatus for reducing stereotyping printing matrices to render them packless, each of said matrices having a pair of depending bolsters at opposite sides thereof for longitudinally locating the matrix relative to the apparatus, comprising a platen of substantially circular segmental cross-section, said platen having an outer wall and a pair of end walls integral with the outer wall, means for longitudinally aligning a matrix with the outer circumferential platen surface, means for clamping one end of said matrix to the platen circumferential outer surface, a substantially cylindrical abrading drum mounted substantially parallel to the longitudinal platen axis, a sheet of abrasive material attached to the outer surface of the abrading drum, said abrasive material being located a short distance radially from the outer surface of the platen a shaft projecting beyond the platen end walls in alignment with the platen longitudinal axis, a pair of side arms rotatably supported by the platen shaft, means fitted to the side arms operative to adjustably support the abrading drum relative to the platen circumferential outer surface, a gear sector integral with one of the side arms substantially concentric with the platen shaft, a drive pinion rotatably mounted adjacent the side arm gear sector for rotating the side arm relative to the platen, means for moving the drive pinion out of engagement with the side arm gear sector to permit restoration of the side arm to its starting position relative to the platen after the side arm has been rotated to the end of its stroke, means for rotatably driving the abrading drum, and means for rotatably driving the sidearm drive pinion synchronized with the abrading roller rotation.

6. An apparatus for reducing stereotyping printing matrices, each of said matrices having a pair of depending bolsters at opposite sides thereof for longitudinally locating the matrix relative to the apparatus, comprising a platen of substantially circular segmental cross-section, said platen having an outer wall and a pair of end walls integral with the outer wall, means for clamping one end of a matrix to the adjacent platen surface, a substantially cylindrical abrasive coated abrading drum mounted substantially parallel to the longitudinal platen axis, a cylindrical shaft projecting beyond the end walls of the platen, a pair of side arms rotatably fitted to the platen shaft projections, means fitted to the side arms operative to radially adjustably support the abrading drum relative to the platen circumferential outer surface, means threadably fitted to each side arm operative to adjust the radial position of the abrading drum relative to the platen outer circumferential surface, a gear sector integral with one side arm substantially concentric with the platen shaft, a drive pinion mounted adjacent the side arm gear sector for rotating the side arm relative to the platen, a tubular bushing fitted to the adjacent platen shaft projecting end for rotatably supporting each side arm, each of said side arms having an open parallel-faced bracket integral therewith in alignment with the platen shaft projections, a pair of angularly positioned shoes fitted to each side arm in a position substantially radial relative to the platen shaft bushing, spring means fitted to each of said shoes operative to press the angularly positioned shoes against the platen shaft bushing to normally retain the side arms concentric with the platen shaft, said side arms being radially movable along the parallel-faced slots to move the abrading drum out of engagement with the adjacent matrix surface to enable the side arms to be restored to their initial position after the abrading drum reaches the end of its path, means for rotatably driving the abrading drum, and means for rotatably driving the side arm drive pinion synchronized with the abrading drum rotation.

7. An apparatus for reducing stereotyping printing matrices, each of said matrices having a pair of depending bolsters at opposite sides thereof for longitudinally locating the matrix relative to the apparatus, comprising a platen of substantially circular segmental cross-section, said platen having an outer wall and a pair of end walls integral with the outer wall, means for longitudinally aligning the matrix with the adjacent platen surface, a sheet of pliable material attached to the circumferential outer surface of the platen, means for clamping one end of said matrix to the sheet of pliable material attached to the circumferential outer platen surface, a substantially cylindrical abrading drum mounted substantially parallel to the longitudinal platen axis, a sheet of abrasive material attached to the abrading drum circumferential outer surface, said abrasive material being operative to reduce the outer surface of a matrix fitted to the platen, a substantially cylindrical shaft projecting beyond the platen end walls, a pair of side arms rotatably supported by the platen shaft, means fitted to the side arms operative to radially adjustably support the abrading drum relative to the sheet of pliable material attached to the platen outer circumference, a gear sector integral with one of said side arms substantially concentric with the platen shaft, a drive pinion rotatably mounted adjacent the side arm gear sector for rotating the side arm relative to the platen, a motor operative to drive the abrading drum and the side arm drive pinion, means for operatively connecting the motor to the abrading drum, means for operatively connecting the motor with the side arm drive pinion, means for coordinating the side arm drive pinion rotation with the abrading roller rotation, a bracket attached to one platen end wall in substantial alignment with one side arm, means mounted on said bracket operative to engage the adjacent side arm to limit the angular movement of the side arm in one direction, switch means supported by said bracket operative to engage the adjacent side arm to shut off the flow of current to the motor before the side arm reaches the end of its normal angular movement.

8. An apparatus for reducing stereotyping printing matrices to render them packless, each of said matrices having a pair of depending bolsters at opposite sides thereof for longitudinally locating the matrix relative to the apparatus, comprising a platen of substantially circular segmental cross-section, said platen having an outer wall and a pair of end walls integral with the outer wall, means for longitudinally aligning a matrix with the circumferential outer platen surface, means for clamping one end of said matrix to the adjacent platen surface, a substantially cylindrical abrading drum mounted substantially parallel to the longitudinal platen axis, a sheet of abrasive material attached to the circumferential outer surface of the abrading drum operative to contact and reduce the outer surface of a matrix mounted on the platen, a shaft projecting beyond the end walls of the platen in substantial alignment with the platen longitudinal axis, a pair of side arms rotatably fitted to the platen shaft projections, means fitted to the side arms operative to adjustably support the abrading drum relative to the outer surface of the platen, the platen having a substantially cylindrical segmental cavity therein of a larger diameter than the abrading drum in substantial alignment with the abrading drum in one position thereof, the platen shaft having a pair of substantially parallel flats formed thereon, in substantial alignment with the platen end walls, each platen end wall having a parallel-faced slot therethrough located in substantial alignment with the platen shaft flats, the platen shaft with the side arms attached thereto being movable along the platen end wall slots to enable the abrading drum to be moved partially into the platen cavity, a gear sector integral with one side arm substantially concentric with the platen shaft, a drive pinion mounted adjacent the side arm gear sector for rotating the side arm relative to the platen, means for rotatably driving the abrading drum, and means for rotatably driving the side arm drive pinion synchronized with the abrading drum rotation.

9. An apparatus for reducing stereotyping printing matrices, each of said matrices having a pair of depending bolsters at opposite sides thereof for longitudinally locating the matrix relative to the apparatus, comprising a platen of substantially circular segmental outer cross-section, said platen having an outer wall and a pair of end walls integral with outer wall, means for longitudinally locating a matrix relative to the circumferential outer platen surface, means for clamping one end of a matrix to the circumferential outer platen surface, a substantially cylindrical abrading drum mounted substantially parallel to the longitudinal platen axis, a sheet of abrasive material attached to the circumferential outer surface of the abrading drum in normal operative contact with the outer surface of a matrix mounted on the platen, a pair of side arms rotatably supported by the platen end walls, means fitted to the side arms operative to radially adjustably support the abrading drum relative to the platen circumferential outer surface, a dust receiving member mounted adjacent the junction between the abrading drum circumference and the circumferential outer platen surface, means attaching said dust receiving member to the side arms, means for rotatably driving the abrading drum, means for rotating the side arms to progressively angularly advance the abrading drum relative to the matrix outer surface, and means for synchronizing the rotation of the side arms with the abrading drum rotation.

10. An apparatus for reducing the surface of a matrix opposite the type face thereof, each of said matrices having a pair of depending bolsters at opposite sides thereof for longitudinally locating the matrix relative to the apparatus, comprising a platen of substantially cylindrical segmental outer contour, said platen having an outer wall and a pair of end walls integral with the circumferential outer wall, a plurality of electrically energized heating elements attached to the circumferential outer wall of the platen operative to heat the circumferential outer platen surface, a sheet of pliable material attached to the circumferential outer surface of the platen, means formed in said platen operative to longitudinally align the matrix relative to the circumferential outer platen surface, an abrading drum mounted substantially parallel to the platen longitudinal axis, a rotatable shaft supporting the abrading drum, an abrasive sheet attached to the circumferential outer surface of the abrading drum, said abrasive sheet being located a short distance radially from the outer surface of the pliable sheet attached to the circumferential outer platen surface, a pair of side arms rotatably supported by the platen end walls, means fitted to the side arms operative to radially adjustably support the abrading drum shaft relative to the circumferential outer platen surface, a pair of levers pivotally attached to the abrading drum, an auxiliary roller rotatably supported by the levers, spring means mounted adjacent the levers operative to press the auxiliary roller against the matrix outer surface to smooth the matrix outer surface in advance of the path of the abrading drum, means for rotatably driving the abrading drum, means for rotating the side arms to progressively angularly advance the abrading drum relative to the matrix outer surface, and means for synchronizing the rotation of the side arms with the abrading support rotation.

References Cited in the file of this patent

UNITED STATES PATENTS

| | | |
|---|---|---|
| 322,288 | Hetherington | July 14, 1885 |
| 912,092 | Droitcour | Feb. 9, 1909 |
| 1,111,611 | Paul | Sept. 22, 1914 |
| 1,611,471 | McFarland | Dec. 21, 1926 |